US005111290A

United States Patent [19]

Gutierrez

[11] Patent Number: 5,111,290

[45] Date of Patent: * May 5, 1992

[54] SURVEILLANCE SYSTEM HAVING A MINIATURE TELEVISION CAMERA AND A RF VIDEO TRANSMITTER MOUNTED IN A MANNEQUIN

[76] Inventor: Frederic J. Gutierrez, 1601 S. Logan St., Denver, Colo. 80210

[ * ] Notice: The portion of the term of this patent subsequent to Jan. 31, 2008 has been disclaimed.

[21] Appl. No.: 635,283

[22] Filed: Dec. 28, 1990

Related U.S. Application Data

[63] Continuation-in-part of Ser. No. 603,526, Oct. 25, 1990, which is a continuation-in-part of Ser. No. 329,599, Mar. 28, 1989, abandoned.

[51] Int. Cl.[5] .............. H04N 7/18

[52] U.S. Cl. .............. 358/108; 358/109; 358/229

[58] Field of Search .............. 358/83, 108, 109, 229; 354/76, 81, 293

[56] References Cited

U.S. PATENT DOCUMENTS 4,819,076 4/1989 Briggs .............. 358/229
4,916,532 4/1990 Streck et al. .............. 358/83
4,982,281 1/1991 Gutierrez .............. 358/229

OTHER PUBLICATIONS

"FCC Won't Protect Unlicensed Device at 900 MHz", p. 58, *QST*, Nov. 1990.
Mannequins Designed to Keep an Eye Out of Crime, Gutierrez, Washington Post, Jul. 89.

*Primary Examiner*—James J. Groody
*Assistant Examiner*—Kim Yen Vu
*Attorney, Agent, or Firm*—Klaas & Law

[57] ABSTRACT

A surveillance system wherein a miniature television surveillance camera and a RF video transmitter are invisibly mounted in a mannequin so that the television surveillance camera transmits signals to the RF video transmitter which converts the received signals and transmits RF video signals to a television monitor at a remote location. A power source, such as a 6 volt or 12 volt battery is also invisibly mounted in the manequin so that each mannequin is an independent and self-contained RF video transmitting station. Mannequins are positioned in selected areas of an establishment so that each lens portion has a desired field of view. In the preferred embodiments the lens portion comprises at least a portion of the iris and pupil of at least one eye of the mannequin.

7 Claims, 2 Drawing Sheets

SURVEILLANCE SYSTEM HAVING A MINIATURE TELEVISION CAMERA AND A RF VIDEO TRANSMITTER MOUNTED IN A MANNEQUIN

This application is a continuation-in-part application of U.S. patent application Ser. No. 603,526 filed Oct. 25, 1990 which application is a continuation-in-part application of U.S. patent application Ser. No. 329,599 filed Mar. 28, 1989, now abandoned.

FIELD OF THE INVENTION

This invention relates generally to surveillance systems such as those used in establishments for observing an area to be controlled and is particularly suited for use in establishments using mannequins.

BACKGROUND OF THE INVENTION

There are many different types of surveillance systems in use today to observe an area to be controlled. In some instances a television camera is mounted on a stationary or rotating holder where it can be readily observed. In other instances, some means are provided to try to obscure the television camera so that it cannot be readily observed. In these systems, the means used to obscure the television camera are very visible themselves so as to minimize the value thereof. Also, the use of such systems requires considerable effort to plan the decorations and merchandising fixtures so that the means used to obscure the television cameras will not provide an unattractive appearance to the establishment. This is particularly so in establishments wherein decor is an important part of the sales effort of the establishment. Therefore, it is desirable to provide a means for obscuring the presence of a television surveillance camera so that it can perform its surveillance functions and at the same time be a true part of the desired decor of the establishment.

BRIEF DESCRIPTION OF THE INVENTION

This invention provides a surveillance system for an establishment using a television surveillance camera that is invisibly mounted in mannequins which are part of the decor of the establishment. Also, a television transmitting system is invisibly mounted in each of the mannequins for transmitting RF video signals to a monitor or recording device.

In a preferred embodiment of the invention, the television camera is mounted in a mannequin so that it has a field of view of a selected area of the establishment. In most establishments there will be a plurality of mannequins at different spaced apart locations and there may be more than one mannequin at each location. Therefore, a television camera may be located in one or more mannequins to have one or more fields of view of one or more selected areas of the establishment. The television surveillance camera is mounted so that its lens forms at least a part of the iris and pupil of at least one of the eyeballs of the mannequin but may be located in other parts of the mannequin. The mounting means for mounting the television surveillance camera in any part of the mannequin, preferably in the eyeball, comprises an open sided holder comprising a flat base member having generally planar top and bottom surfaces. At least three sidewalls, preferably integral with the base member, extend upwardly from the base member at an angle of ninety degrees thereto. An opening is formed in one of the sidewalls. A hollow tube is mounted on the one sidewall and passes through the opening so as to have one end portion inside the open sided holder and another end portion outside the open sided holder. A television surveillance camera is mounted in the open sided holder so that the lens portion thereof is aligned with the opening of the one end portion of the hollow tube. One eyeball of the mannequin has an iris and a pupil which is the same color as the iris and pupil of the other eyeball of the mannequin but which is transparent. A linearly extending passageway is formed in the one eyeball and has one end having an opening behind the iris and pupil and another end having an opening out of the opposite side of the one eyeball. The another end portion of the hollow tube is inserted into the passageway so that the open end thereof is immediately behind the pupil so that its field of view extends in the same direction as the pupil. Also, a television transmitting system is located in each of the mannequins for transmitting RF video signals to a receiver/monitor or recording device. The mannequin is then positioned in the customary way in the establishment so that the television surveillance camera has a field of view of a selected area of the establishment.

In another preferred embodiment of the invention, the passageway extends completely through the one eyeball and has one end having an opening comprising at least a part of the iris and pupil of the one eyeball and another end having an opening out of the other side of the one eyeball. Another hollow tube is positioned in the passageway and has one end located next adjacent to the pupil. A lens is secured in the one end of the hollow tube wherein the lens has the same color as the adjacent portions of the iris and pupil. The another end portion of the hollow tube is inserted into the another hollow tube so that the television surveillance camera in the open sided holder has a field of view through the iris and pupil of the one eyeball. The mannequin is then positioned in the customary way in the establishment so that the television surveillance camera has a field of view of a selected area of the establishment.

BRIEF DESCRIPTION OF THE DRAWINGS

An illustrative and presently preferred embodiment of the invention is shown in the accompanying drawings in which.

DETAILED DESCRIPTION OF THE INVENTION

Figure 1:
FIG. 1 is a view of a portion of a mannequin.

In FIG. 1, there is illustrated the upper portion of a female mannequin 2 having two eyeballs 4 and 6 with a television surveillance camera 8, FIG. 3, mounted in one eyeball 4 as described below. While the preferred mounting of the television surveillance camera 8 is in the eyeball 4, it is understood that it can be mounted in other parts of the mannequin 2 providing that the lens thereof is not apparent. While a female mannequin is illustrated in FIG. 1, it is understood that various types of mannequins may be used in accordance with the preferred embodiment of this invention provided that the mannequin has at least one eyeball. Also the mannequin will have the customary characteristics that it can be located in a display in any part of an establishment (not shown). Thus, the mannequin is part of the decor of the establishment. The television surveillance camera 8, such as that marketed by SONY under the trade designation HVM-332, is a miniature television surveillance camera capable of transmitting a signal to a receiver/-monitor and/or recording the area being observed.

Figure 2:
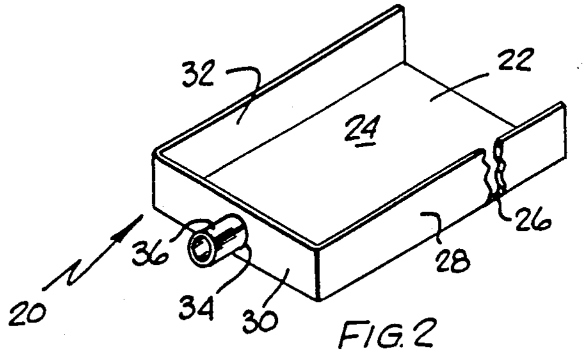
FIG. 2 is a perspective view of an open sided holder for use in the invention.
Figure 3:
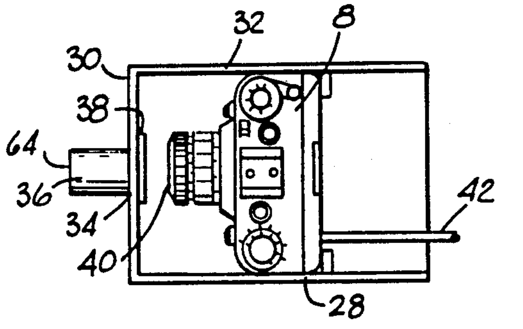
FIG. 3 is a top plan view of FIG. 2 with a television surveillance camera mounted therein.

An open sided holder 20 is illustrated in FIGS. 2 and 3 and comprises a flat base member 22 having a generally planar top surface 24 and a generally planar bottom surface 26. At least three sidewalls 28, 30 and 32 extend upwardly from the top surface 24 at an angle of ninety degrees thereto. Preferably, the sidewalls 28, 30 and 32 are integral with the base member 22. If the open sided holder 20 is formed from metal, the adjacent edges of the sidewalls may be secured together by suitable means, such as by welding. If desired, the open sided holder 20 may be molded using a suitable high density plastic material such as high impact styrene. An opening 34 is formed in a central portion of the sidewall 30. A hollow tube 36 has one end portion 38 which is mounted on the sidewall 30 so that at least a portion thereof extends through the opening 34. The television surveillance camera 8 has a lens portion 40 that is aligned with the opening 34 when the television surveillance camera 8 is mounted in the open sided holder 20. If desired, the hollow tube 36 may be designed so that the lens portion 40 can fit into the open end of the hollow tube 36 at the opening 34. Also, conventional electric signal conducting wires 42 project outwardly from the television surveillance camera 8.

Figure 4:
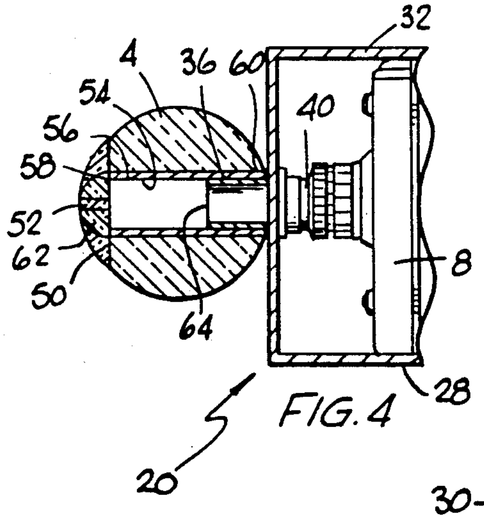
FIG. 4 is a cross-sectional view of one embodiment of the invention.

A preferred embodiment of the invention is illustrated in FIG. 4 and comprises at least one eyeball 4 having an iris 50 and a pupil 52. A passageway 54 extends in a linear direction through the eyeball 4, and a hollow tube 56 is mounted therein. The hollow tube 56 has one opening 58 in the iris 50 and pupil 52 and another opening 60 on the opposite side of the eyeball 4. A transparent lens 62 is mounted on the hollow tube 56 so as to cover the opening 58 and has the same color and shape as the iris 50 and pupil 52 of the other eyeball 6. The hollow tube 36 is inserted into the hollow tube 56 so as to mount the open sided holder 20. If desired, the hollow tube 36 may have a sufficient length so that the open end 64 thereof is in contact with the lens 62. The lens 40 of the television surveillance camera 8 is aligned with the hollow tube 56 and, as described above, may be inserted into the hollow tube 56.

Figure 5:
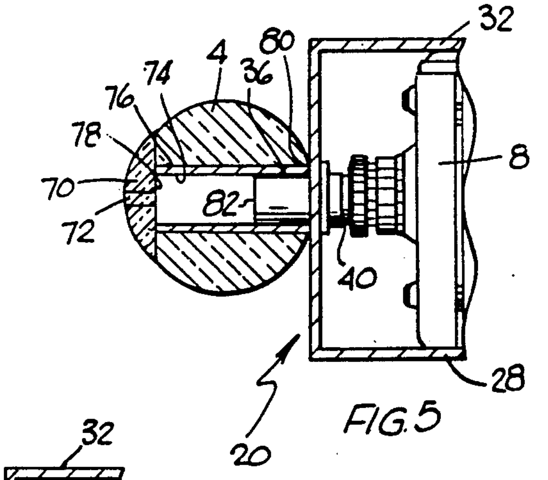
FIG. 5 is a cross-sectional view of another embodiment of the invention.

Another preferred embodiment of the invention is illustrated in FIG. 5 and comprises at least one eyeball 4 having a transparent iris 70 and a transparent pupil 72. A passageway 74 extends in a linear direction through the eyeball 4 and a hollow tube 76 is mounted therein. If desired, the hollow tube 76 may be omitted. The hollow tube 76 has one opening 78 immediately behind the iris 70 and pupil 72 and another opening 80 on the opposite side of the eyeball 4. The hollow tube 36 is inserted into the hollow tube 76 so as to mount the open sided holder 20. If desired, the hollow tube 36 may have a sufficient length so that the open end 82 thereof is in contact with the back portion of the iris 70 and pupil 72. The lens 40 of the television surveillance camera 8 is aligned with the hollow tube 76 and, as described above, may be inserted into the hollow tube 76.

Figure 6:
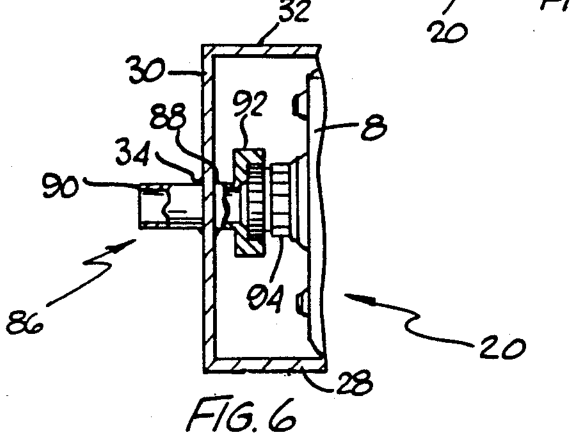
FIG. 6 is a partial top plan view of another embodiment of the open sided holder.

A modification of the open sided holder 20 is illustrated in FIG. 6 where parts similar to those in FIG. 3 have been given the same reference numerals. A hollow tube 86 is mounted in the opening 34 in the sidewall 30 so as to have one end portion 88 inside of the open sided holder 20 and another end portion 90 outside of the open sided holder 20. The one end portion 88 may be provided with an enlarged flange portion 92 to accommodate a larger lens housing 94. The open sided holder 20 functions the same as those described in relation to FIGS. 3–5. The eyeball 4 may be mounted in structure in the mannequin so that it will support the open sided holder 20 and the television surveillance camera 8 or the open sided holder 20 may be supported in the mannequin so that it will support the eyeball. Also, the hollow tube 56 or 76 may be mounted in the eyeball 4 with a universal joint adjacent to the iris and pupil and the end of the open sided holder can be revolved in a circular path so as to increase the field of view of the television surveillance camera.

Figure 7:
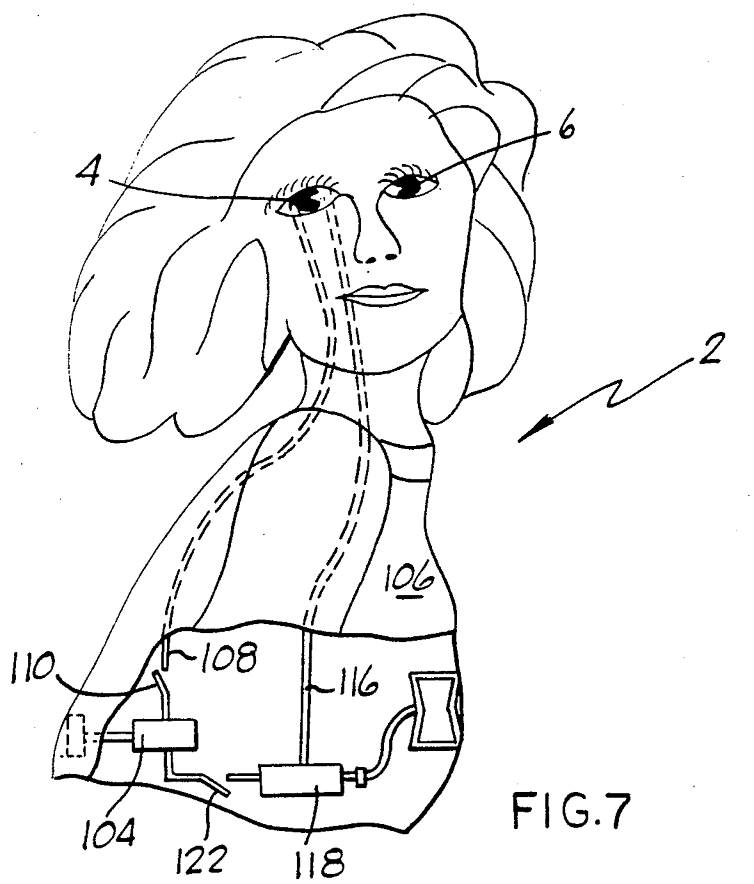
FIG. 7 is a view of a portion of a mannequin having the invention illustrated therein.
Figure 8:
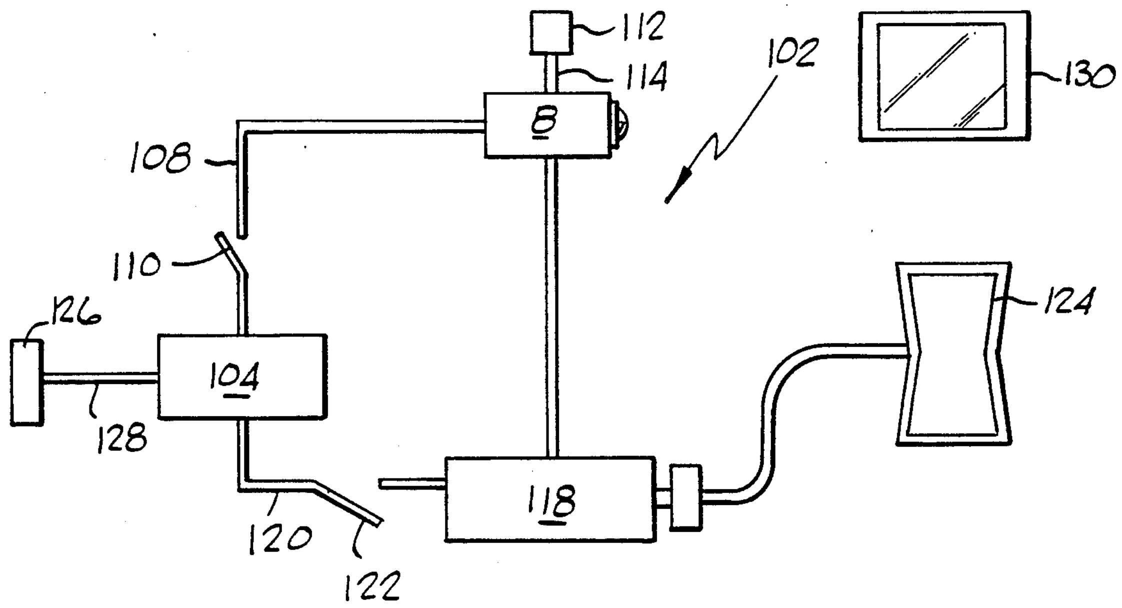
FIG. 8 is an electronic circuit for the invention.

In FIGS. 7 and 8, there is illustrated an RF video transmission system 102 for use with the surveillance mannequins. An electric power source 104, such as a 6 volt or 12 volt battery, is located within the body portion 106 of the mannequin 2. The electric power source is electrically connected to the surveillance camera 8, described above, located in the eyeball 4 of the mannequin 2 by electrical conduit 108 having a switch 110, illustrated in the off position, located therein. A microphone 112 is electrically connected to the surveillance camera 8 through electrical conduit 114. An electrical signal from the surveillance camera 8 is transmitted through an electrical conduit 116 to an RF video transmitter 118, such as that marketed by Wireless Technology, Inc. under the trade designation FS-975LR, which is connected to the electrical power source 104 through an electrical conduit 120 having a switch 122, illustrated in the off position, located therein. The RF video transmitter 118 converts the received signals and transmits RF signals at a frequency between about 906–928 MHz through an antenna 124, such as the illustrated bow-tie antenna. A charging unit 126 is connected to the electric power source 104 through electrical conduit 128. Therefore, each mannequin 2 is an independent and self-contained RF video transmitting station. A television receiver/monitor 130 may be located where desired to receive and display the transmitted signals.

In operation, the switches 110 and 122 are moved to the closed position. The surveillance camera 8 transmits a signal to the RF video transmitter 118 which converts the received signals and transmits RF signals through the antenna 124 to be picked up by and displayed by the television receiver/monitor 130 at a desired location. If desired, the television receiver/monitor 130 can have a recording device associated therewith.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. The combination of a surveillance camera, a video transmitter and a mannequin comprising:

a mannequin positioned in a display in an establishment;

a surveillance camera having a lens portion;

mounting means for invisibly mounting said surveillance camera in said mannequin so that said lens portion has a field of view of a selected area of said establishment; and a video transmitter invisibly mounted in said mannequin to convert and transmit signals received from said surveillance camera.

2. A surveillance system for an establishment which surveillance system uses a television camera and a video transmitter mounted in at least one mannequin which is part of the decor of the establishment comprising:

at least one mannequin positioned in a display in an establishment;

a surveillance camera having a lens portion;

mounting means for invisibly mounting said surveillance camera in said mannequin so that said lens portion has a field of view of a selected area of said establishment; and a video transmitter invisibly mounted in said mannequin for converting and transmitting signals received from said surveillance camera.

3. The invention as in claim 2 wherein said transmitted signals comprise:

RF video signals in the frequency range of between about 906–928 MHz.

4. The invention as in claim 2 and further comprising:

a plurality of mannequins as part of said decor; and a surveillance camera and a video transmitter mounted in at least more than one of said plurality of mannequins to provide fields of view of selected areas of said establishment.

5. The invention as in claim 2 wherein said at least one mannequin comprises:

a plurality of mannequins as part of said decor; and a surveillance camera and a video transmitter mounted in each of said plurality of mannequins to provide fields of view of selected areas of said establishment.

6. A surveillance system for an establishment which surveillance system uses a television camera and a video transmitter mounted in at least one mannequin which is part of the decor of the establishment comprising:

at least one mannequin positioned in a display in an establishment;

a surveillance camera having a lens portion;

mounting means for invisibly mounting said surveillance camera in said mannequin so that said lens portion has a field of view of a selected area of said establishment;

said mannequin having at least one eyeball having an iris and pupil providing said field of view;

said eyeball having a passageway extending therethrough and having an opening behind said iris and pupil;

said lens portion being aligned with said opening behind said iris and pupil; and a video transmitter invisibly mounted in said mannequin for converting and transmitting signals received from said surveillance camera.

7. The invention as in claim 6 wherein said transmitted signals comprise:

RF video signals in the frequency range of between about 906–928 MHz.

* * * * *